(12) United States Patent
Lagnado (10) Patent No.: US 10,338,873 B2
(45) Date of Patent: Jul. 2, 2019

(54) WAVEGUIDES IN A COMPUTING DEVICE

(71) Applicant: HEWLETT-PACKARD DEVELOPMENT COMPANY, L.P., Houston, TX (US)

(72) Inventor: Isaac Lagnado, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/535,822

(22) PCT Filed: Feb. 27, 2015

(86) PCT No.: PCT/US2015/018186
§ 371 (c)(1),
(2) Date: Jun. 14, 2017

(87) PCT Pub. No.: WO2016/137518
PCT Pub. Date: Sep. 1, 2016

(65) Prior Publication Data
US 2017/0351474 A1    Dec. 7, 2017

(51) Int. Cl.
| | |
|---|---|
| *G06F 13/14* | (2006.01) |
| *G06F 3/14* | (2006.01) |
| *G08C 17/02* | (2006.01) |
| *G09G 5/00* | (2006.01) |
| *G09G 5/36* | (2006.01) |
| *G06F 3/147* | (2006.01) |

(52) U.S. Cl.
CPC .............. *G06F 3/1431* (2013.01); *G06F 3/14* (2013.01); *G06F 3/1446* (2013.01); *G06F 3/1454* (2013.01); *G08C 17/02* (2013.01); *G09G 5/006* (2013.01); *G09G 5/363* (2013.01); *G06F 3/147* (2013.01); *G09G 2300/026* (2013.01); *G09G 2360/04* (2013.01); *G09G 2370/16* (2013.01)

(58) Field of Classification Search
CPC . G06F 1/1698; G06F 1/1683; G09G 2370/16; G09G 5/006; G09G 5/363
See application file for complete search history.

(56) References Cited

U.S. PATENT DOCUMENTS

| | | | |
|---|---|---|---|
| 8,823,640 | B1 | 9/2014 | Harris |
| 2001/0006375 | A1 | 7/2001 | Tomooka et al. |
| 2010/0254477 | A1* | 10/2010 | Uchida ................... H01P 1/182 375/269 |

(Continued)

OTHER PUBLICATIONS

"Put Your Tablet to Work as a Secondary Pc Display, to Get More Things Done"; Aug. 11, 2012; 5 pages.

*Primary Examiner* — Hau H Nguyen
(74) *Attorney, Agent, or Firm* — HPI Patent Department (57) ABSTRACT

Examples disclosed herein relate to a computing device. In one aspect, the computing device may include a housing including a first point and a second point spatially separated from each other, a first and second wireless communications modules, and a controller. A first waveguide may couple the first point to an input of the first wireless communications module, where an output of the first wireless communications module may be coupled to an input of the controller. A second waveguide may couple the second point to an output of the second communications module, where an input of the second communications module may be coupled to an output of the controller.

15 Claims, 4 Drawing Sheets

(56) References Cited

U.S. PATENT DOCUMENTS

| | | | |
|---|---|---|---|
| 2011/0194240 A1* | 8/2011 | Hansen | G06F 1/1698 361/679.28 |
| 2012/0206372 A1 | 8/2012 | Mundt et al. | |
| 2013/0222209 A1 | 8/2013 | Watanabe | |
| 2013/0285882 A1 | 10/2013 | Jiang et al. | |
| 2013/0285896 A1 | 10/2013 | Lim | |
| 2014/0232617 A1 | 8/2014 | Anite | |
| 2014/0253416 A1 | 9/2014 | Stahl et al. | |
| 2014/0281534 A1 | 9/2014 | McCormack et al. | |
| 2015/0138714 A1* | 5/2015 | Davis | G06F 1/1683 361/679.28 |
| 2015/0333724 A1* | 11/2015 | Lahti | H01Q 13/06 343/860 |

\* cited by examiner

WAVEGUIDES IN A COMPUTING DEVICE

BACKGROUND

Many computing devices today include or are connected to more than one monitor. Multiple monitors can be arranged as extensions of each other, allowing the user to easily move displayed contents from one monitor to another, thereby expanding the amount of content that can be displayed simultaneously. Alternatively, multiple monitors may be configured to display the same contents, allowing users to share their screens with other users.

BRIEF DESCRIPTION OF THE DRAWINGS

The following detailed description references the drawings, wherein.

DETAILED DESCRIPTION

As discussed above, users of computing devices may want to extend or share their screens across multiple displays. Many computing devices can be connected to external monitors. In some cases, however, a computing device may not support connection to an external monitor. For example, a computing device may be a small portable device whose form factor may not allow for large cable connectors that may sometimes be required to connect to an external monitor, or the user may not have the right connection cable readily available. External monitors are also often powered through AC outlets, which are not available in many places.

Some examples disclosed herein describe a computing device, The computing device may include, among other things, a housing, which may include a first side surface and a second side surface which opposes the first side surface. The first side surface may include a first input point and a first output point spatially separated from the first input point, and the second side surfaces may include a second input point and a second output point spatially separated from the second output point. The computing device may also include a first wireless communications module, a second wireless communications module, and a controller. The computing device may also include a first waveguide that may couple the first input point, the second input point, and an input of the first wireless communications module, where an output of the first wireless communications module may be coupled to an input of the controller. The computing device may also include a second waveguide that may couple the first output point, the second output point, and an output of the second communications module, where an input of the second communications module may be coupled to an output of the controller.

Figure 1:
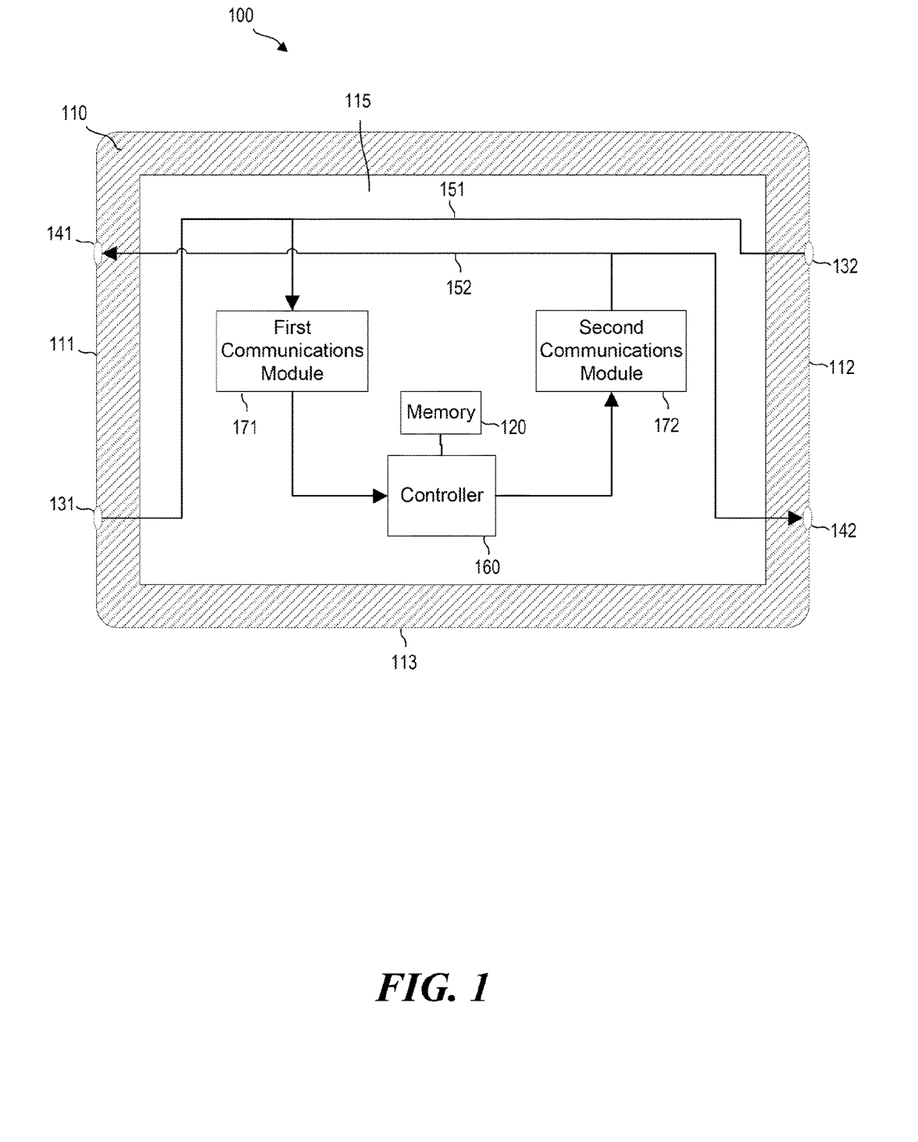
FIG. 1 is a block diagram of an example computing device.

FIG. 1 is a block diagram of an example computing device 100. Computing device 100 may include any electronic device or a combination of electronic devices. The term "electronic device" as used herein may include any combination of portable and stationary electronic devices. Thus, computing device 100 may include, for example, a smartphone, a tablet computer, a laptop computer, a smart watch or another wearable device, a desktop computer, a server, a digital camera, a gaming device, a printer, a retail point of sale device, a digital signage device, a scientific instrument, or the like.

In some examples, as illustrated in FIG. 1, computing device 100 may include a display 115. In some examples, display 115 may be a part of computing device 100. For example, computing device 100 may have a housing 110, and display 115 may be integrated or embedded into housing 110. In other examples, display 115 may be separate from and communicatively coupled to computing device 100. Display 115 may include any type of display, screen, or monitor, such as a cathode ray tube (CRT) display, a liquid crystal display (LCD), a plasma display panel (PDP), a light emitting diode (LED) display, an organic light-emitting, diode (OLED), and the like. In some examples, display 115 may be a touch-sensitive screen.

In some examples, housing 110 may have a front surface, a back surface, and two or more side surfaces. In some examples, the front surface may include a display, such as display 115. The side surfaces may be flat, curved, or have any other shape. In some examples, housing 110 may include a first side surface 111 and a second side surface 112 opposing (e.g., parallel to) first side surface 111. In some examples, housing 110 may also include a third side surface 113 that may, in some examples, be perpendicular to first side surface 111 and/or to second side surface 112. In some examples, housing 110 may be positioned such that third side surface is set either horizontally (e.g., as a top or bottom surface) or vertically (e.g., as a left-side or right-side surface). It is appreciated that the examples discussed herein are not limiting and that housing 110 may have any other suitable shapes and sizes.

In some examples, computing device 100 may include a first input point 131, a second input point 132, and a first communications module 171. In some examples, input points 131 and 132 may be communicatively coupled to each other and/or to an input of module 171 via electronic, optical, or other means. For example, as illustrated in FIG. 1, input points 131 and 132 may be coupled to each other and to the input of module 171 via a first waveguide 151. Waveguide 151 may include any materials (e.g., plastic) suitable for propagating electromagnetic waves having one or more frequencies (e.g., 60 GHz) from points 131 and 132 to the input of module 171 and, in some examples, from the input of module 171 to points 131 and 132. In some examples, waveguide 151 may have parameters (e.g., diameter, length, refractive indices, etc.) optimized for propagating waves having one or more predefined frequencies. For example, waveguide 151 may be a 60-GHz waveguide, i.e., waveguide 151 may have parameters optimized for propagating 60-GHz signals.

In some examples, if input, points 131 and 132 are coupled to first communications module 171 via waveguide 151, input points 131 and 132 may not include active components. Instead, input points 131 and 132 may include spatially separated openings in side surfaces 111 and 112, respectively, through which waveguide 151 may protrude from housing 110. Described differently, in some examples, input points 131 and 132 may be points on side surface 111 and 112, respectively, through which electromagnetic waves (e.g., light) can exit from waveguide 151 into the space (e.g., air) outside housing 110, and/or enter waveguide 151 from the space outside housing 110. Signals entering waveguide 151 may propagate through waveguide 151 toward the input of communications module 171, and vice versa, signals originating at communication module 171 may propagate through waveguide 151 toward points 131 and 132, and exit into the air through these points. In some examples, signals entering waveguide 151 from the air through points 131 and 132 may originate at another electronic device. For example, the signals may originate at module 172 of another computing device 100, and propagate into the air through output points 141 and/or 142 of the other computing device 100. In some examples, input points 131 and 132 may include lenses (e.g., lens-shaped plastic caps) for focusing incoming signals and increasing their signal strength.

Based on the above discussion, it is appreciated that while the term "input point" is used to describe input points 131 and 132, these points are not limited to receiving signals from other devices, and that in some examples first communications, module 171 may also send signals through waveguide 151 and via input points 131 and 132 into the air to be received by other devices. Such signals may include, for example, signals sent in response to the signals received from the other devices, as will be discussed in more detail below.

In some examples, input points 131 and 132 may not be optically coupled to first communications module 171 via waveguide 151, but may be electronically coupled to first communications module 171 via one or more wires. In these examples, input points 131 and 132 may each include a wireless receiver (e.g., a Bluetooth receiver, a near field communication (NFC) receiver, etc.) to receive wireless signals from other devices. In these examples, the wireless receiver may also optionally process and decode the received signals and to send the optionally processed and decoded signals to controller 160 either via module 171 or directly (in which case module 171 may be omitted from computing device 100). Alternatively or in addition, input points 131 and 132 may each include an input cable connector such as a High-Definition Multimedia Interface (HDMI) connector, a Digital Video Interface (DVI) connector, a Universal Serial Bus (USB) connector, or any other type of connector. Accordingly, in some examples, computing device 100 may be coupled to other devices via one or more cables (e.g., HDMI cables, DVI cables, USB cables, etc.) which may be attached, for example, to the input cable connectors and to output cable connectors of the other devices.

In some examples, first communications module 171 may generally represent any combination of hardware and programming capable of receiving input data (e.g., through points 131 and 132), optionally processing the input data, and sending the (optionally processed) input data to the input of controller 160, to which module 171 may be coupled electrically, optically, or via other suitable means. In some examples (e.g., where module 171 is coupled to points 131 and 132 via waveguide 151) module 171 may be equipped with one or more components configured to receive signals from points 131 and 132 signals and to filter, decode, or otherwise process the received signals. The signals may be extremely high frequency (EHF) signals, such as 60-GHz signals.

Input data may include any combination of image data, video data, text data, audio data, or any other type of analog and/or digital data. In some examples, input data may also include communication data (e.g., handshaking information, header information, etc.) based on which communications with other devices may be established and maintained. In some examples, first communications module 171 may also be configured to generate and send through input points 131 and 132 response communication data (e.g., response handshaking information, acknowledgment information, error information, etc.) based on which communications with other devices may be established and/or maintained, Thus, in some examples, module 171 may also be equipped with one or more components configured to send signals such as EHF (e.g., 60 GHz) signals to points 131 and 132 through waveguide 151.

In some examples, computing device 100 may also include a first output point 141, a second output point 142, and a second communications module 172. In some examples, output points 141 and 142 may be communicatively coupled to each other and/or to an output of module 172 via electronic, optical, or other means. For example, as illustrated in FIG. 1, output points 141 and 142 may be coupled to each other and to the output of module 172 via a second waveguide 152. Waveguide 152 may include any materials (e.g., plastic) suitable for propagating electromagnetic waves having one or more frequencies (e.g., 60 GHz) from points 141 and 142 to the output of module 172 and, in some examples, from the output of module 172 to points 141 and 142. In some examples, waveguide 152 may have parameters (e.g., diameter, length, refractive indices, etc.) optimized for propagating waves having one or more predefined frequencies. For example, waveguide 152 may be a 60-GHz waveguide, i.e., waveguide 152 may have parameters optimized for propagating 60-GHz signals.

In some examples, if output points 141 and 142 are coupled to second communications module 172 via waveguide 152, output points 141 and 142 may not include active components. Instead, output points 141 and 142 may include spatially separated openings in side surfaces 111 and 112, respectively. Described differently, in some examples, input points 141 and 142 may be points on side surface 111 and 112, respectively, through which electromagnetic waves (e.g., light) can exit from waveguide 152 into the space (e.g., air) outside housing 110, and/or enter waveguide 152 from the space outside housing 110. Signals entering waveguide 152 may propagate through waveguide 152 toward the input of communications module 171, and vice versa, signals originating at communication module 172 may propagate through waveguide 152 toward points 141 and 142, and exit into the air through these points. In some examples, signals entering waveguide 152 from the air through points 131 and 132 may originate at another electronic device. For example, the signals may originate at module 171 of another computing device 100, and propagate into the air through output points 131 and/or 132 of the other computing device 100. In some examples, output points 141 and 142 may include lenses (e.g., lens-shaped plastic caps) for focusing incoming signals and increasing their signal strength.

Based on the above discussion, it is appreciated that while the term "output point" is used to describe output points 141 and 142, these points are not limited to sending signals to other devices, and that in some examples second communications module 172 may also be configured to receive through waveguide 152 and through input points 141 and 142 signals sent by other devices, such as signals sent by the other devices in response to the signals sent by computing device 100.

In some examples, output points 141 and 142 may not be optically coupled to second communications module 172 via waveguide 152, but may be electronically coupled to second communications module 172 via one or more wires. In these examples, output points 141 and 142 may each include a wireless transmitter (e.g., a Bluetooth transmitter, an NFC transmitter, etc.) configured to transmit wireless signals to other devices. In these examples, the wireless transmitter may receive the signals to be transmitted from controller 160 either via module 172 or directly (in which case module 172 may be omitted from computing device 100). Alternatively or in addition, output points 141 and 142 may each include an output cable connector such as an HDMI connector, a DVI connector, a USB connector, or any other type of connector. Accordingly, in some examples, computing device 100 may be coupled to other devices via one or more cables (e.g., HDMI cables, DVI cables, USB cables, etc.) which may be attached, for example, to the output cable connectors and to input cable connectors of the other devices.

In some examples, second communications module 172 may generally represent any combination of hardware and programming capable of sending output data (e.g., through points 141 and 142) received from the output of controller 160, to which module 171 may be coupled electrically, optically, or via any other suitable means.

In some examples (e.g., where module 172 is coupled to points 141 and 142 via waveguide 152) module 172 may be equipped with one or more components configured to send signals to points 131 and 132. The signals may be EHF signals, such as 60-GHz signals.

Output data may include any combination of image data, video data, text data, audio data, or any other type of analog and/or digital data. In some examples, output data may also include communication data (e.g., handshaking information, header information, etc.) based on which communications with other devices may be established and maintained. As mentioned above, in some examples, second communications module 172 may also be configured to receive via output points 141 and 142 response communication data (e.g., response handshaking information, acknowledgment information, error information, etc.) based on which communications with other devices may be established and/or maintained. Thus, in some examples, module 172 may also be equipped with one or more components configured to receive signals such as EHF (e.g., 60 GHz) signals from points 141 and 142 through waveguide 152, and to filter, decode, and otherwise process the signals.

In some examples, controller 160 may generally represent any combination of hardware and programming capable of receiving input data from module 171. As discussed above, the input data may include, among other things, image and video data. Controller 160 may be configured to process the image and/or video data and provide the data (processed or unprocessed) for display, for example, on display 115. Accordingly, in some examples, computing device 100 may be configured to display on display 115 image and/or video data received from other devices via at least one of points 131 and 132. In some examples, computing device 100 may be configured to simultaneously display on display 115 image and/or video data received from both points 131 and 132, for example, where data received from point 131 is displayed in a first portion of display 115, and data received from point 132 is displayed in a second portion of display 115. In some examples, the user may be able to configure parameters (e.g., size and position) of the first and second portions.

In some examples, controller 160 may also be configured to obtain display data. Display data may include any combination of image and video data. Display data may include image and/or video data that is currently being displayed on display 115 or that is being provided for display on display 115. Display data may also include extended image and video data that is provided for display on another display. In some examples, the display data may be provided by one or more hardware and/or software modules such as an operating system or one or more applications running on computing device 100. In some examples, computing device may include a memory 120, and the display data may be stored in memory 120. Memory 120 may include any type of non-transitory memory, and may include any combination of volatile and non-volatile memory. For example, memory 120 may include any combination of random-access memories (RAMS), flash memories, hard drives, memristor-based memories, and the like. Memory 120 may generally represent any number of memory modules, some of which may be included in controller 160, module 171, module 172, or any other modules of computing device 100. In some examples, memory 120 may facilitate exchange and processing of input data, output data, display data, and other data discussed herein, where one module may be configured to store data in memory 120 and another module may be configured to retrieve the stored data from memory 120.

Upon obtaining the display data (e.g., from memory 120), controller 160 may be configured to provide the display data to second communications module 172, whose input may be communicatively (e.g., optically, electrically, or otherwise) coupled to an output of controller 160. Module 172 may then send the display data (e.g., via second waveguide 152) to first output point 141, to second output point 142, or to both. Thus, computing device 100 may in some examples be configured to transmit through output points 141 and 142 display data that is being displayed, has just been displayed, or is about to be displayed on display 115. As discussed above, in some examples, the display data may be transmitted through points 141 and 142 to other devices in a wired manner. For example, if points 141 and 142 include an output cable connector, a cable (e.g., HDMI cable) can be attached to one of points 141 or 142, and to an input of another device, such as an input point 132 or 131 of another computing device 100. In other examples, the display data may be transmitted through points 141 and 142 to other devices in a wireless manner. For example, the display data may propagate as an electromagnetic wave (e.g., a 60-GHz wave) through waveguide 152, exit housing 110 through point 141 (or 142), propagate some distance through the air, and enter waveguide 151 through input point 132 (or 131) of another computing device 100. In other examples, the display data may propagate as an electrical signal through a wire (not shown) between module 172 and point 141 (or 142) and transmitted into the air by a wireless transmitter (not shown) disposed at or near point 141 (or 142). The display data may then be received by a wireless receiver of another device. Upon receiving the display data, the other device may be configured to display it on its display.

In some examples, if the data is transmitted between two devices in a wireless manner, e.g., using a special wireless transmitter or using a waveguide as described above, the two devices may be located next to each other such that the receiver(s) of one device are close enough to the transmitter(s) of the other device to be able to receive the signals transmitted by the other device. For example, two computing devices 100 may be located such that at least one input point (131 or 132) of a first computing device 100 is located within such proximity (e.g., 0.5 cm, 1 cm, 5 cm, etc.) of at least one output point (141 or 142) of a second computing device 100 that the display data transmitted through the output point can be received by the input point with no or few (e.g., less than 50%) errors.

In some examples, computing device 100 may be configured to simultaneously display any combination of the following: input data received via first input point 131; input data received via second input point 131; and display data provided for display (e.g., through memory 120) by the operating system and/or various software and/or hardware applications running on computing device 115. For example, computing device 100 may be configured to display input data received from first input point 131 in a first, portion of the screen; and/or to display input data received from second input point 132 in a second portion of the screen; and/or to display data provided for display by the operating system and/or application running on computing device 100 in a third portion of the screen. In some examples, the parameters (e.g., sizes and positions) of the three portions may be configurable by the user of computing device 100.

Figure 2A:
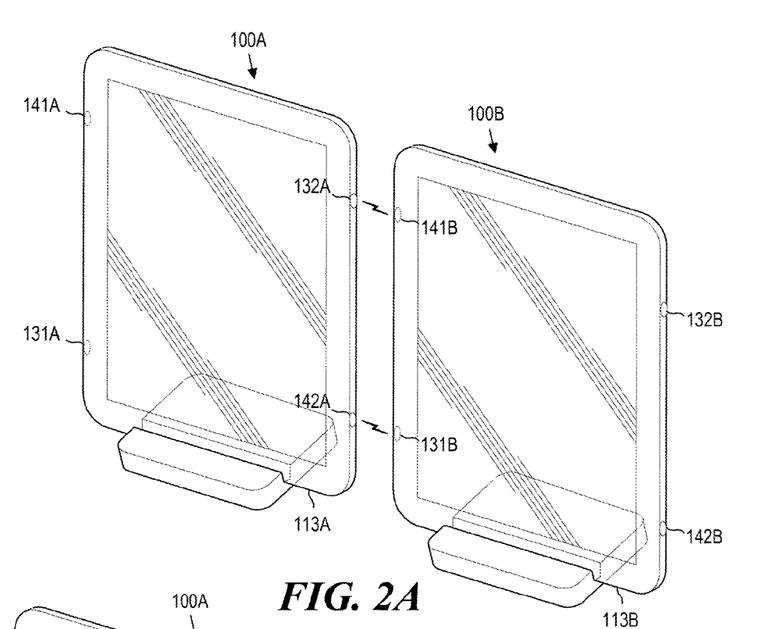
FIG. 2A illustrates a perspective view of example computing devices.
Figure 2B:
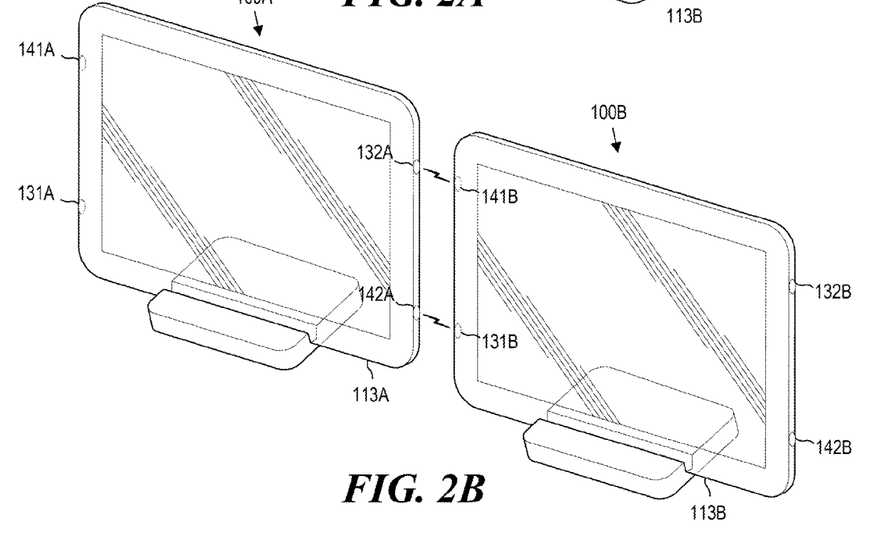
FIG. 2B illustrates a perspective view of other example computing devices.

FIG. 2A illustrates two example computing devices 100A and 100B positioned side by side in a vertical (portrait) orientation, and FIG. 2B illustrates two example computing devices 100A and 100B positioned side by side in a horizontal (landscape) orientation. As illustrated in FIGS. 2A and 2B, in some examples computing devices 100A and 100B may each be docked into a docking station, which may provide each device with support, power supply, and other potential functionality. In the examples of FIGS. 2A and 2B, each computing device 100 has its input points 131 and 132 disposed at the same height (e.g., at the same distance from a third side surface 113) as its output points 142 and 141, respectively. Thus, in some examples, input point 131 may be located directly across output point 142 and input point 132 may be located directly across output point 141. As a result, in some examples, when computing devices 100A and 100B are placed (e.g., docked) on the same side surface (e.g., 111), first output point 141B of device 100B may be positioned next to (e.g., at the same height and within a short horizontal distance from) second input point 132A of device 100A. Similarly, second output point 142A of device 100A may be positioned next to (e.g., at the same height and within a short horizontal distance from) first input point 131B of device 100B.

As discussed above, in this configuration, computing device 100A may receive via second input point 132A display data being transmitted from first output point 141B of computing device 100B, where the display data may correspond to data being displayed on display of computing device 100B. Upon receiving the display data, computing device 100A may display the display data on its display. Alternatively or in addition, computing device 100B may receive via first input point 131B display data being transmitted from, second output point 142A of computing device 100A, where the display data may correspond to data being displayed on display of computing device 100A. Upon receiving the display data, computing device 100B may display the display data on its display.

As discussed above, in some examples, the display data transmitted by a first computing device (e.g., 100A) may include image and/or video data being displayed on the first computing device. In such examples, a second computing device (e.g., 100B) receiving the transmitted display data may display it on its display, thereby sharing (e.g., copying) the screen of the first computing device on the display of the second computing device. In other examples, the display data transmitted by a first computing device (e.g., 100A) may include extended image and/or video data that is different from the data being displayed on the first computing device. In such examples, a second computing device (e.g., 100B) receiving the transmitted display data may display it on its display. This may effectively turn the display of the second computing device into an extension of the first computing device, or vice versa.

Figure 3:
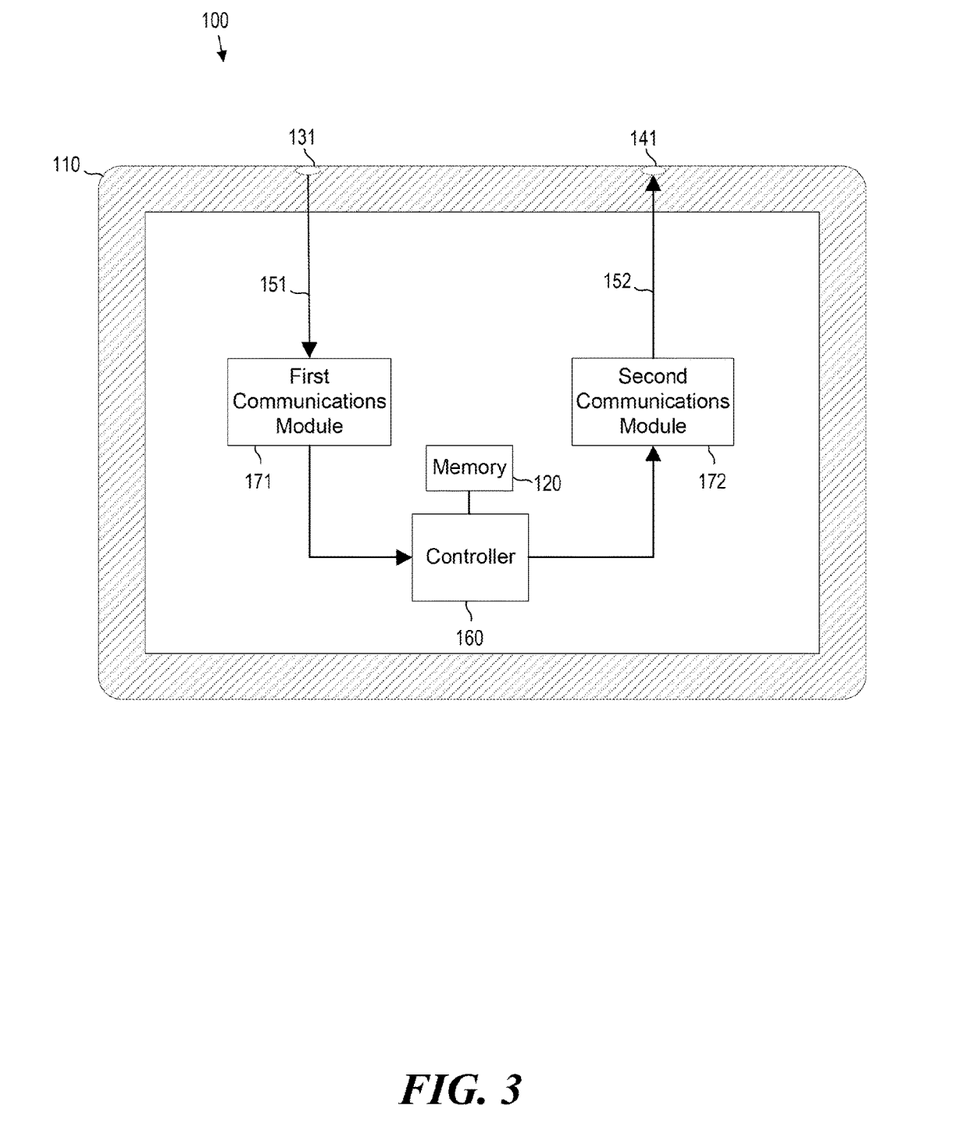
FIG. 3 is a block diagram of another example computing device.

FIG. 3 illustrates another example computing device 100. In this example computing device 100 includes first input point 131 and first output point 141, but does not include second input point 132 and second output point 142. Thus, in this example, the input of module 171 is connected (e.g., via waveguide 151) to point 131 only and the output of module 172 is connected (e.g., via waveguide 152) to point 141 only.

Figure 4A:
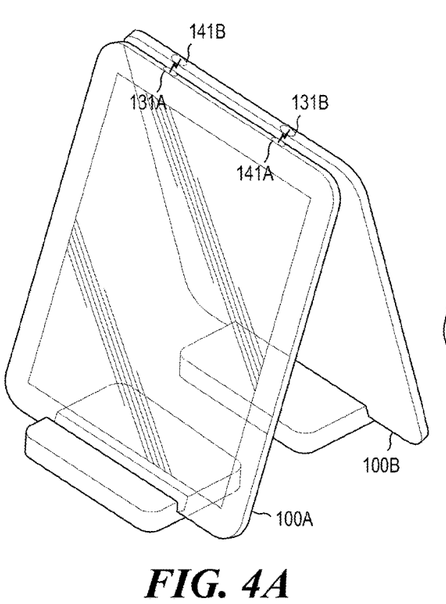
FIG. 4A illustrates a perspective view of example computing devices.
Figure 4B:
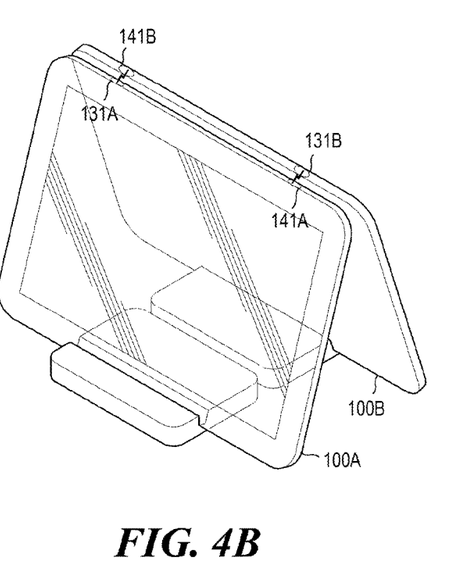
FIG. 4B illustrates a perspective view of other example computing devices.

FIG. 4A illustrates two example computing devices 100A and 100B positioned back to back in a vertical (portrait) orientation, and FIG. 4B illustrates two example computing devices 100A and 100B positioned back to back in a horizontal (landscape) orientation. As illustrated in FIGS. 4A and 4B, computing devices 100A and 100B may each be docked into a docking station. In the examples of FIGS. 4A and 4B, computing devices 100A and 100B are positioned such that first output point 141B of device 100B is positioned next to (e.g., at the same height and within a short horizontal distance from) first input point 131A of device 100A. Similarly, first output point 141A of device 100A is positioned next to (e.g., at the same height and within a short horizontal distance from) first input point 131B of device 100B. In some examples, to achieve better back-to-back alignment of the two devices, points 131 and 141 of each computing device 100 may be positioned within the same distance from the center of the side surface on which they are disposed.

Figure 4C:
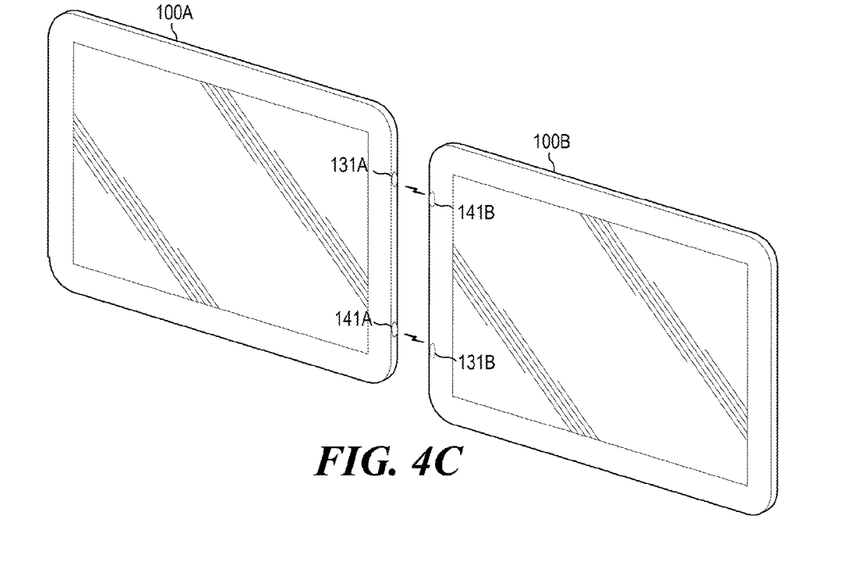
FIG. 4C illustrates a perspective view of yet other example computing devices.

In FIG. 4C, computing devices 100A and 100B from the example of FIG. 3 are illustrated. In this example, devices 100A and 100B are positioned side by side and at least one of the devices is not docked to a docking station. In this configuration, points 131 and 141 of each computing device 100 may be positioned within the same distance from the center of the side surface on which they are disposed. As a result, first output point 141B of device 100B may be positioned next to (e.g., at the same height and within a short horizontal distance from) first input point 131A of device 100A, and first output point 141A of device 100A may be positioned next to (e.g., at the same height and within a short horizontal distance from) first input point 131B of device 100B. Based on the foregoing discussion, it is appreciated that computing devices 100A and 100B in the examples of FIG. 4A, 4B, and 4C may each share its screen with the other device or extend its screen to the display of the other device.

In the foregoing discussion, first communications module 171, second communications module 172, and controller 160 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like. In another example, some or all of first communications module 171, second communications module 172, and controller 160 may be implemented by hardware logic in the form of electronic circuitry, such as application specific integrated circuits.

The invention claimed is:

1. A computing device, comprising:
a housing, the housing including a first side surface and a second side surface which opposes the first side surface;
a first input point disposed on the first side surface;
a first output point disposed on the first side surface, wherein the first output point is spatially separated from the first input point;
a second input point disposed on the second side surface;
a second output point disposed on the second side surface, wherein the second output point is spatially separated from the second output point;
a first wireless communications module with a first module input and a first module output;
a first waveguide coupled to the first input point, the second input point, and the first module input;
a second wireless communications module with a second module input and a second module output;
a second waveguide coupled to the first output point, the second output point, and the second module output; and
a controller, wherein the first module output is coupled to an input of the controller, and wherein the second module input is coupled to an output of the controller.

2. The computing device of claim 1, wherein:
the first waveguide protrudes from the housing through the first input point and through the second input point; and the second waveguide protrudes from the housing through the first output point and through the second output point.

3. The computing device of claim 1, wherein the housing includes a third side surface perpendicular to the first and second side surfaces, and wherein:
the first input point's distance from the third side surface corresponds to the second output point's distance from the third side surface; and the first output point's distance from the third side surface corresponds to the second input point's distance from the third side surface.

4. The computing device of claim 1 further comprising a display, wherein the controller is to:
obtain display data associated with the display; and provide the display data to another device via the second wireless communications module, the second waveguide, and at least one of the first output point and the second output point.

5. The computing device of claim 1, wherein the first wireless communications module and the second wireless communications module are operable with 60 GHz frequencies.

6. The computing device of claim 1, wherein the controller comprises a video graphics controller.

7. A computing device, comprising:
a housing with an upper side surface;
a first point disposed on the upper side surface, wherein the first point is to receive a first signal from air;
a second point disposed on the upper side surface, wherein the second point is spatially separated from the first point, and wherein the second point is to transmit a second signal into the air;
a first wireless communications module with a first module input and a first module output;
a first waveguide coupled to the first point and the first module input;
a second wireless communications module with a second module input and a second module output;
a second waveguide coupled to the second point to the second module output; and
a controller, the controller including a controller input and a controller output, wherein the first module output is coupled to the controller input, and wherein the second module input is coupled to the controller output.

8. The computing device of claim 7, wherein the first point is associated with a data input and the second point is associated with data output.

9. The computing device of claim 7, wherein the first wireless communications module and the second wireless communications module are operable with extremely high frequencies (EHF).

10. The computing device of claim 7, further comprising a display, wherein the controller is to:
receive input data from another computing device via the first point, the first waveguide, and the first wireless communications module; and provide the input data for display on the display.

11. A computing device, comprising:
a housing including a first point and a second point spatially separated from each other, wherein the first point is to receive a first signal from air, and wherein the second point is to transmit a second signal into the air;
a first wireless communications module to operate with 60 GHz frequencies;
a second wireless communications module to operate with 60 GHz frequencies; and
a controller, the controller including a controller input and, a controller output,
wherein a first waveguide couples the first point to an input of the first wireless communications module, and wherein an output of the first wireless communications module is coupled to an input of the controller,
wherein a second waveguide couples the second point to an output of the second wireless communications module, and wherein an input of the second wireless communications module is coupled to an output of the controller, and
wherein the first point is associated with data input and the second point is associated with data output.

12. The computing device of claim 11, wherein the first point and second point are on a same side surface of the housing.

13. The computing device of claim 11, wherein the housing further includes a third point and a fourth point, wherein the first waveguide couples the first point and third point to the input of the first wireless communications module, and wherein the second waveguide couples the second point and fourth to an output of the second wireless communications module.

14. The computing device of claim 11, further comprising a display, wherein the controller is to:
   obtain display data being displayed on the display; and
   provide the display data to another device via the second wireless communications module, the second waveguide, and the second point.

15. The computing device of claim 11, further comprising a display, wherein the controller is to:
   receive input data from another computing device via the first point, the first waveguide, and the first wireless communications module; and
   provide the input data for display on the display.

* * * * *

UNITED STATES PATENT AND TRADEMARK OFFICE
CERTIFICATE OF CORRECTION

PATENT NO. : 10,338,873 B2
APPLICATION NO. : 15/535822
DATED : July 2, 2019
INVENTOR(S) : Isaac Lagnado Page 1 of 1

It is certified that error appears in the above-identified patent and that said Letters Patent is hereby corrected as shown below:

In the Claims

In Column 9, Line 61, Claim 4, delete "claim 1" and insert -- claim 1, --, therefor.

Signed and Sealed this
First Day of October, 2019

Andrei Iancu
*Director of the United States Patent and Trademark Office*